(No Model.)
W. D. BROOKS.
MACHINE FOR APPLYING SOLDER TO CAN CAPS.
No. 431,933. Patented July 8, 1890.
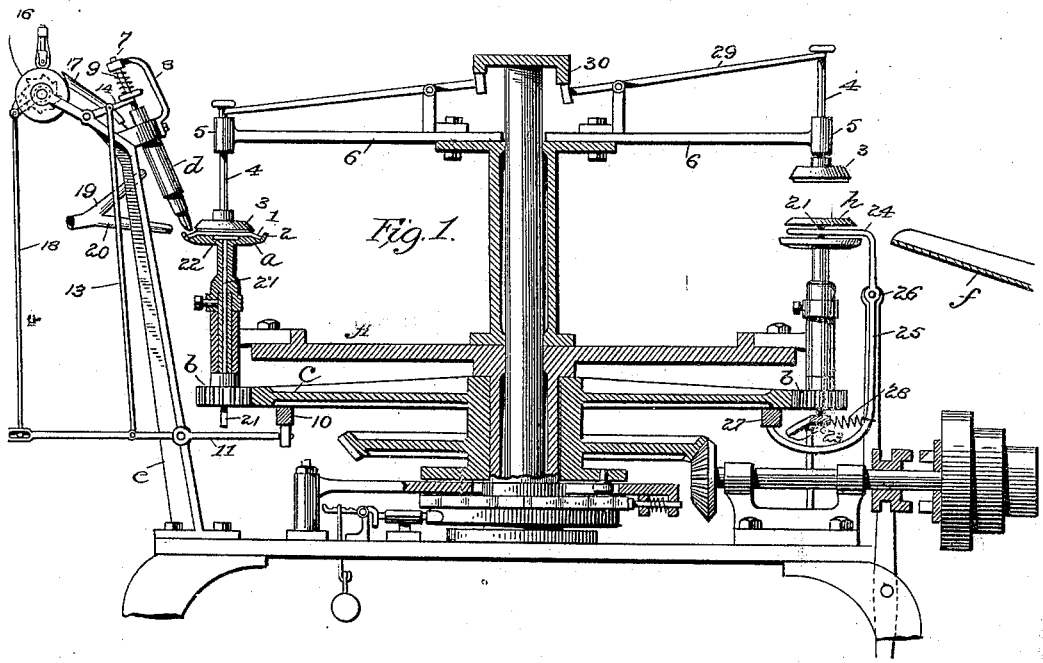
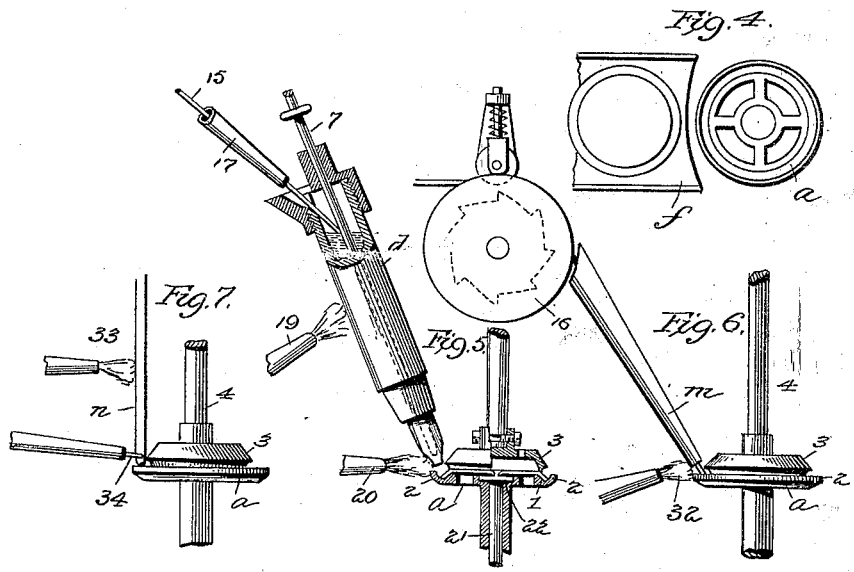
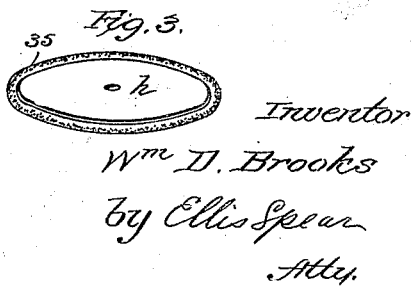
Attest:
Inventor
Wm. D. Brooks
by Ellis Spear
Atty.

UNITED STATES PATENT OFFICE.

WILLIAM DYER BROOKS, OF BALTIMORE, MARYLAND, ASSIGNOR TO MARY E. BROOKS, OF SAME PLACE.

MACHINE FOR APPLYING SOLDER TO CAN-CAPS.

SPECIFICATION forming part of Letters Patent No. 431,933, dated July 8, 1890.

Application filed March 5, 1890. Serial No. 342,755. (No model.)

*To all whom it may concern:*

Be it known that I, WILLIAM DYER BROOKS, of Baltimore, Maryland, have invented a new and useful Improvement in Machines for Applying Solder to Can-Caps; and I do hereby declare that the following is a full, clear, and exact description of the same.

My invention relates to the soldering of the caps of cans, such as the ordinary provision-cans; and it consists of a machine for applying to the can-cap a bead of solder in the manner and for the purpose hereinafter described.

Heretofore the edges of the sheets used in forming tin cans have been provided with a film of solder formed by dipping them into a bath of molten solder, the same being described in Letters Patent of the United States No. 92,258, granted on the 6th day of July, 1869. Further, in United States Patent No. 364,662, of June 14, 1887, is described a sheet-metal can-cap having its edge provided with a band or strip of solder folded over the edge, the solder being applied in the form of a thin ribbon.

It is desirable to provide the can-caps with a larger amount of solder than that which would adhere to the edge of the sheet metal when dipped in the molten solder, and also to have this solder evenly distributed upon the upper edge of the cap, so that when the cap is seated in its groove in the head of the can the edge thereof will bear upon the seat, and the solder when melted will be sweated through into the seam from above. In addition to these desirable objects I have sought also to provide for the rapid, accurate, and uniform application of the solder to the caps.

My invention is illustrated in the accompanying drawings, in which—

Figure 1 represents a central vertical section of the entire machine, some of the working parts being shown in side elevation. Figs. 2 and 3 show, respectively, a section and perspective view of the cap. Fig. 4 shows a plan view of a part of the spout and its relation to the machine. Fig. 5 is a detail view, on a larger scale, of the device for supporting the cap and applying the solder. Figs. 6 and 7 show modifications.

I have shown the devices by which my invention is practically applied as embodied in the ordinary form of table having step-by-step movement.

The general construction of the table and the devices by which it is operated, together with the devices by which the caps are rotated for the application of the solder, are substantially the same as those shown in Letters Patent of the United States, granted to me on the 16th day of July, 1889, No. 407,161.

Instead of the ordinary seat mounted upon the spindles which have the planetary movement, I have provided a seat *a*, which has a central plain surface, which in shape and diameter corresponds to the plain under surface of the cap. Around or bordering on this plain surface is a downwardly-inclined bevel 1, on which rests snugly the downwardly-bent flange on the margin of the cap when in place, and outside of this is an upwardly-raised rim of the seat marked 2, the bevel and the rim forming an annular groove. The parts are so proportioned to the diameter of the cap that the edge of the cap rests against the inner face of the rim and leaves a groove in which the solder is molded. The plain under surface of the cap and the form of flange are shown more clearly in the section Fig. 2.

This device is to support the cap while the solder is applied, and from this the process or method may be readily understood, which consists in molding upon the margin of the upper face of the cap a bead of solder in a molten condition. This may be done by a variety of devices of simple nature and by hand work, which would necessarily be slow and more expensive, it being required only that the molten solder be poured evenly upon the edge, either turning the cap by the hand or moving the hand around the edge of the cap; but in a machine having rotating cap-supporting disks the cap is turned to the solder-applying devices.

In order to hold the cap down while the solder is applied, I have provided a pressure-foot 3, having an under surface fitted in size and shape to cover the plain upper portion of the cap, but to leave between its edge and the margin of the cap an annular space, which is to receive the bead of solder. The foot is held upon a spindle 4, adapted to turn freely in a sleeve 5 on an arm 6, carried with the table. The cap-seat $a$ is turned by the pinion $b$, in mesh with the master-wheel $c$, as fully explained in the aforesaid patent. The weight of the foot is sufficient to hold down the cap; but a light spring may be used if the foot be made light.

I have thus described a single cap-holder; but it will be readily understood that I design a series of these arranged about the circular table as the can-holders are arranged in my said patent and in this class of machines used for heading cans, and the table in this machine has the same step-by-step movement sufficient to bring the caps successively to the solder-applying devices as the cans are brought in heading-machines above referred to.

In the form shown in Figs. 1 and 5 the solder is contained in a molten condition in a tube $d$, which is supported on a bracket $e$, mounted on the base on which the table turns. The tube has a small nozzle at its lower end, with an orifice for the escape of the solder, and is placed, preferably, in an inclined position, so as to bring the nozzle directly over the margin of the cap when in its place upon the seat and at the station where the solder is applied. The tube is provided with a valve-stem 7, which extends axially therein, and the lower end of the stem forms a valve to close the orifice. The stem is held in a bracket 8, and is normally pressed down by a light spring 9. It is raised at the proper moment by means of a cam-face projection 10 on the outside of the master-wheel $c$, which projection strikes the inner end of the lever 11 at the instant when the cap reaches its place under the nozzle. The lever lifts the rod 13, and this in turn lifts a lever 14, which rests under a collar on the stem 9, and raises the valve off its seat to allow the solder to be discharged onto the margin of the cap. The cap is continuously revolved and the step-by-step movement of the table is timed to allow a cap to remain at the station long enough to complete the required number of revolutions and receive the solder around the whole margin.

In order to keep the reservoir in the tube $d$ continuously supplied with solder, it is fed in the form of wire 15 from a roll or drum 16 through a tube 17. The drum is turned by means of a pawl and ratchet worked by a rod 18, connected to the lever 11, so that an increment of solder is added at each station to compensate for the loss. The solder wire is melted by the heat of that in the reservoir. The heat is maintained by a gasoline flame from a tube 19, which flame bears against the tube $d$. Another branch of tube 20 is arranged to bear against the nozzle of the tube $d$ to cause the free flow of the solder on the cap. The lower flame may play over and against the rim of the seat and the cap edge.

In order to prevent the solder from adhering to the pressure-foot and the seat, it is better to face them with porcelain or some other suitable material to which the solder will not adhere. As soon as the revolution of the cap-seat is completed, another movement of the table A takes place in moving the cap, which has been supplied with solder from the flame, and bringing another to its place. As soon as the seat starts from the soldering-point, the cam projection 10 lifts the lever 11 and allows the valve to close again. In this way the cans are brought successively to the solder-applying devices and are moved therefrom step by step until they reach the discharge-station at another point in the circumference of the machine. Such a discharge-station is shown on the right of Fig. 1. At that station where the seat stops is a chute $f$, the chute being arranged as shown in Fig. 4, with the chute having its upper end near the seat $a$. Just before it reaches this station the stem 21, which carries on its upper end a disk 22, resting normally in a recess in the seat, is lifted by a cam marked 23, and this raises the cap off its seat. This is done just before the seat in its motion reaches a curved arm 24, extending horizontally across the path of the seat and just above its surface. The stem rides over the cam-path and drops to its place as the seat reaches its position under the arm. The arm is on the lever 25, pivoted at 26, and its lower end is curved underneath the master-wheel, where it comes in contact with a projection 27, which moves it to bring the arm into position above described and as shown in Fig. 1. As soon as the seat reaches the discharging-station at that instant the end of the lever 25 passes off from the projection and a spring 28 suddenly draws the lever inward and tips the cap $h$ off onto the chute. The seat is then emptied and passes on to another station, where the attendant puts on the caps. Before the seat can be thus discharged the pressure-foot must be lifted. This is effected by means of a lever 29, (one for each pressure-foot,) which is pivoted on a standard on the arm 6, and the inner end of it is operated at the proper time by the cam-track 30, this track being arranged to let the foot down after the seat has passed the discharge and feed stations.

Instead of the reservoir in the tube $d$, I may apply the wire solder directly to the margin of the cap, as shown in Fig. 6, in which the wire solder is fed down through the guide-tube $m$, and it is melted as it projects on the margin by a flame 32.

In Fig. 7 I have shown another modification, in which a soldering-iron $n$ takes the place of the nozzle and is kept hot by the flame 33, while the wire solder 34 is fed against it or near enough to be melted by the heat.

By the means above described a bead 35 of solder is led down the margin on the upper surface of the cap, and when the cap is in place on the can-head and the heat applied thereto the solder runs down into the groove and is sweated into the seam.

I claim as my invention—

1. The revolving seat having a groove about its edge to receive the can-cap, a presser-foot for holding down the can-cap, and means for applying molten solder to the margin of said cap, substantially as described.

2. A revolving seat having a groove about its edge, a presser-foot for holding down the cap, a reservoir-tube arranged to deliver the solder to the margin of the cap, and means for heating said tube, substantially as described.

3. In combination with the revolving seat, a reservoir-tube, means for supplying solder thereto, and a flame-tube having one branch applied to the reservoir-tube and another applied to the nozzle, substantially as described.

4. A revolving seat having a plane surface and an inclined margin and having also a flange 2, turned upwardly, combined with a presser-foot covering the plane surface and forming a channel between its margin and the flange 2, substantially as described.

In testimony whereof I have signed my name to this specification in the presence of two subscribing witnesses.

WILLIAM DYER BROOKS.

Witnesses:
WALTER DONALDSON,
FRANK L. DYER.